July 13, 1971 W. G. HESPENHEIDE 3,592,745

PROCESS FOR MANUFACTURING A MAGNETIC MEMORY

Original Filed Sept. 25, 1958 2 Sheets-Sheet 1

INVENTOR.
WILBUR G. HESPENHEIDE

BY Fidler, Bradley & Patnaude

ATTORNEYS

INVENTOR.
WILBUR G. HESPENHEIDE
BY Fidler, Bradley & Patnaude
ATTORNEYS

United States Patent Office 3,592,745
Patented July 13, 1971

3,592,745

PROCESS FOR MANUFACTURING A MAGNETIC MEMORY

Wilbur G. Hespenheide, Westlake Village, Calif., assignor to Burroughs Corporation, Detroit, Mich.

Division of application Ser. No. 630,995, Apr. 14, 1967, which is a continuation of application Ser. No. 826,088, May 15, 1969. Said application Ser. No. 630,995, being a division of application Ser. No. 763,241, Sept. 25, 1958, now Patent No. 3,545,745. This application Apr. 17, 1969, Ser. No. 816,917
Int. Cl. C23b 5/32, 5/58, 5/68
U.S. Cl. 204—28 17 Claims

ABSTRACT OF THE DISCLOSURE

To form a magnetic memory matrix, a wire matrix is formed of intersecting insulated and uninsulated conductors and then ferromagnetic material is coated upon the uninsulated conductors.

This application is a division of my copending United States application entitled "Magnetic Material and Data Store," Ser. No. 630,995 filed Apr. 14, 1967, which has been abandoned in favor of a continuation application entitled "Electroplating Method of Fabricating Plated Wire Memory Units," Ser. No. 826,088, filed May 15, 1969. The application Ser. No. 630,995 was, in turn, a division of my copending United States application, Ser. No. 763,241, filed Sept. 25, 1958, now U.S. Pat. 3,545,745, which had the same title.

In U.S. Pat. 3,154,769, which is assigned to the assignee of this application, it is disclosed how beneficial results may be obtained by wrapping a central conductor with a ferromagnetic material having a direction of easy magnetization helical around the central conductor. In technical publications descriptions have been given of the production of a helical axis of easy magnetization by twisting either a solid ferromagnetic rod or a central conductor coated with ferromagnetic material. The consequences of such twisting were reported long ago by Wiedemann, and associated electrical phenomena are known as the Wiedemann effect. Twisting of a rod is a particular way of producing shear stresses in it; and shear, according to well known principles of elasticity, is equivalent to mutually orthogonal compressive and tensile stresses, at forty-five degrees with the direction of shear. Thus the twisting of a rod, while effective in producing a helical direction of easy magnetization in an external ferromagnetic skin, will necessarily produce (insofar as the twisting is effective in such production) a helical angle of forty-five degrees. Depending upon various design consign considerations, it may be desirable to produce directions of easy magnetization having helical angles either greater or less than forty-five degrees. Also it is desirable to produce rods or wires which bear ferromagnetic coatings having controlled magnetic properties and helical directions of easy magnetization as produced, without the application of torsion. Yet more generally, it is desirable for many purposes to produce by electrodeposition a ferromagnetic coating having a controlled and predetermined direction of easy magnetization.

My invention consists in electroplating upon a base conductor, in a magnetic field a coating of ferromagnetic material of suitable magnetic properties, which, in consequence of the circumstances of its deposition, possesses a controlled direction of preferred or easy magnetization; and in addition in utilizing a base conductor thus coated as a device for storing information or data having two possible values or significances for each of its component units or bits.

Thus one object of my invention is to produce a conductive element having a controlled direction of easy ferromagnetization helical about its central axis.

Another object of my invention is to produce a conductive element having a controlled direction of easy ferromagnetization when in mechanical equilibrium without the external application of stresses, and consisting of a single mechanical element without the application of separate parts such as wrappings of tape or wire.

A further object of my invention is to produce a conductive element having a controlled direction of easy ferromagnetization which is peculiarly suited to inexpensive production in large quantities, and under conditions conducive to easy control of its magnetic properties.

Still a further object of my invention is to produce a central conductor coated with magnetic material having a controlled direction of easy magnetization and to utilize that product in the construction of a novel binary data store.

Other objects and advantages of my invention will appear in the subsequent specifications and description.

In U.S. Pat. No. 3,047,475, which is assigned to the assignee of this application, I teach the deposition by electro-plating of nickel-iron alloys of controllable magnetic properties, especially coercive force. I have found that the application of a magnetic field to such alloys during their deposition has the effect of producing in the deposited alloy a direction of easy or preferred magnetization substantially aligned with the direction of the field thus applied. The process of electrodeposition or electroplating requires the passage of currents in the vicinity of (and indeed, through) the material being deposited; but such current flow is not, in the prior art, controlled for the purpose of establishing magnetic fields of determined magnitude or direction; and the nature of the electrodeposition process produces a continuous variation in current flow through the base or substrate and the coating which necessarily makes any such fields highly variable over the surface on which deposition is occurring. My present invention, on the other hand, envisages the deliberate and controlled application of fields from conductors distinct from the ones being coated, or from permanent magnets, and also the deliberate and controlled passage through the conductor being coated of currents in excess of the depositing current, such that there will always be produced at the site of deposition a field sufficient in magnitude and direction to determine the direction of easy magnetization of the deposit.

My invention may be practiced in several ways. Where a simple pattern or disposition of the axis of easy or preferred magnetization (which will hereinafter be described by the short identification "preferred axis") is all that is required, it is usually possible to apply from a source other than the base conductor a magnetic field sufficient in magnitude to assure that its resultant with fields from plating currents and other casual sources will be substantially in the direction desired. However, there are particular applications where relatively complex forms of the preferred axis are desirable or essential, as, for example, a helical pattern about a central conductor, at a predetermined helical angle. Such a pattern may be produced according to my invention by passing through the central conductor during the plating operation a current in addition to the plating current. The curren through the central conductor will produce a magnetizing field component circular around the central conductor. A current-carrying solenoid around the conductor will produce an axial magnetizing field component. The resultant magnetizing field will be helical about the wire, and will, if of sufficient intensity, produce a helical preferred axis, whose helical angle will be determined by the relative magnitudes of the magnetizing field component produced by the solenoid and of the magnetizing field component produced by the current through the central conductor. The amplitude of the resultant magnetizing field at any point can, of course be calculated by the well-known rules for vector addition. Where the magnetizing field components produced by the current through the solenoid and the current through the central conductor are orthogonal, the resultant field is the square root of the sum of the squares of the amplitudes of the two magnetizing field components. The angle is thus arbitrarily adjustable by controlling the ratio of these magnitudes. It is true that the current through the central conductor will not be constant throughout its length, because some of the current will pass through the plating bath. However, this effect may be reduced to a permissibly low magnitude by making the current which passes completely through the wire during the plating operation sufficiently large compared with the plating current. Furthermore, if a continuous plating operation is conducted in which the wire is fed continuously through the plating bath (as is described in more detail hereinafter), each part of the wire will be subjected equally to all the slightly varying conditions, and the resulting product will therefore be uniform along its length.

For the better understanding of my invention, I include figures of drawing, which are here listed and briefly described.

Figure 1:
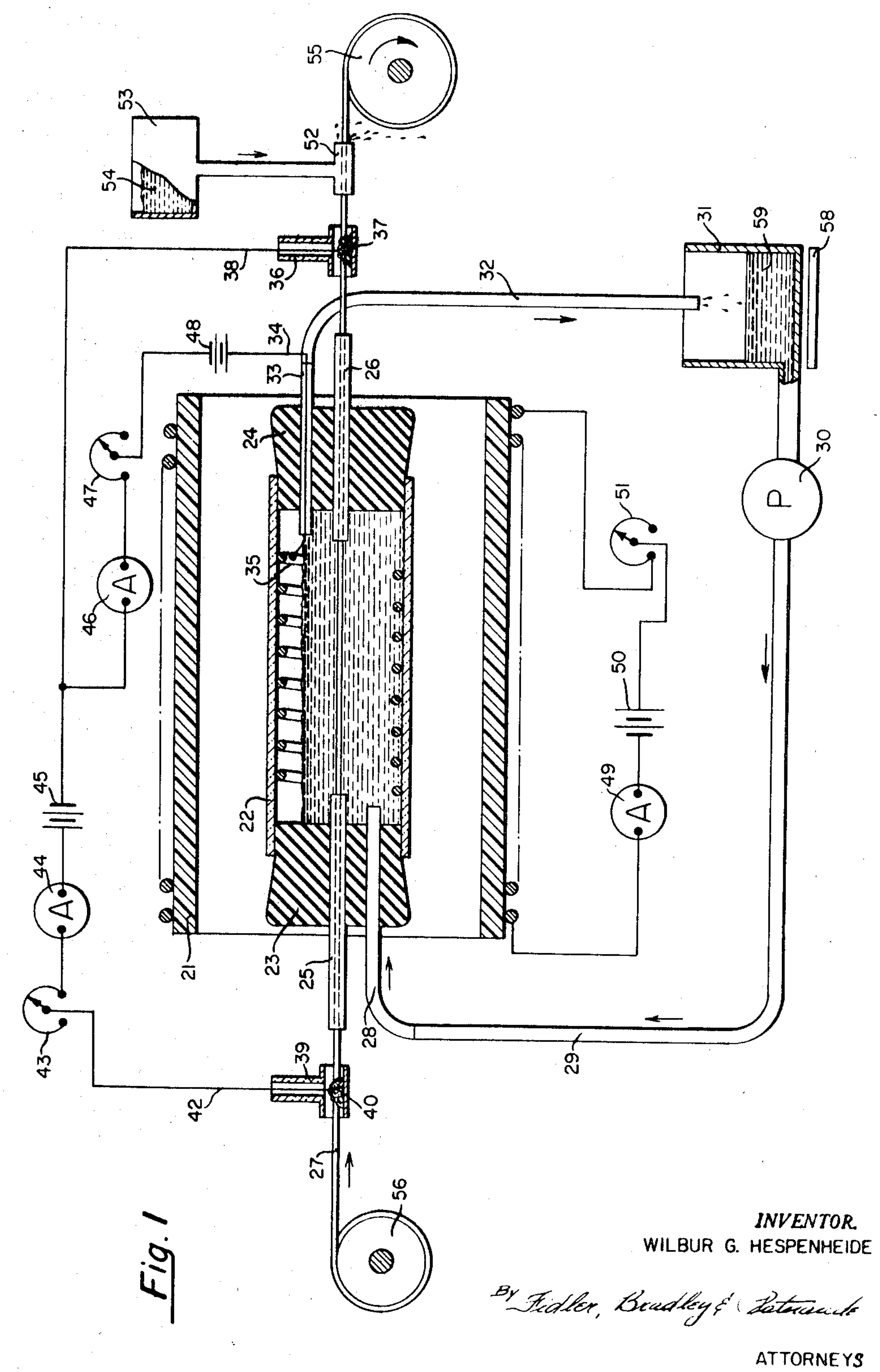
FIG. 1 represents, in section, an arrangement of apparatus for plating on a central conductor magnetic material having a preferred axis helical about the central conductor, by a continuous process.

In FIG. 1, solenoid 21 surrounds the plating cell 22, a glass tube stoppered by rubber stoppers 23 and 24. Capillary tube 25 is centrally located in stopper 23; it serves for ingress of wire 27 which is fed from reel 56, which revolves on bearings not detailed. Capillary tube 26 serves for egress of wire 27. In my experiments, I have found eight inches between the inner ends of tubes 25 and 26 satisfactory. The plating anode 35 is conveniently a helix of nickel wire wound to fit fairly snugly inside tube 22. The connection to anode 35 is made by conductor 34 which pasess through tube 33, which is connected by flexible tube 32 to electrolyte storage container 31. The desired temperature for the electrolyte 59 may be obtained by the use of heater 58 to heat container 31 and its contents. The electrolyte 59 is circulated continuously by pump 30 through tube 29 and tube 28 into the plating cell or tube 22. I have found a rate of about 50 milliliters per minute satisfactory. Electrical connection to the moving wire is made by mercury contacts 37 and 40 which are held in T's 36 and 39, respectively. In operation, the plating current flows from current source 48, represented as a battery, through lead 34 to anode 35, into electrolyte solution 59, to wire 27, and through the wire 27 to mercury contact 37, thence to wire 38, via a branch to ammeter 46, rheosat 47, and back to current source 48. The magnetizing current through the wire 27 flows from current source 45, here represented as a battery, through ammeter 44, rheostat 43, lead 42, mercury contact 40 to wire 27, through wire 27 to mercury contact 37 and wire 38 back to current source 45. Solenoid 21 is fed current through its unnumbered leads from current source 50, represented as a battery, and rheostat 51, and the solenoid current is returned via ammeter 49 to current source 50.

In summary, the above description establishes the paths for a plating current to produce a plated coating on wire 27 during its passage through electrolyte 59 in tube 22; for additional magnetizing current through wire 27 from mercury contact 40 to mercury contact 37; and for current to solenoid 21. In one embodiment solenoid 21 is approximately 40 centimeters long, has an internal diameter of 1.25 inches, and is wound with 1804 turns of insulated wire.

The wire 27 is initially wound on reel 56, and passes through mercury contact 40, capillary tube 25, the electrolyte 59 which is circulated through tube 22, through capillary 26, mercury contact 37, a T 52 which is continuously fed water 54 from a source 53, the said water serving to wash off traces of electrolyte 59, and is wound on motor driven reel 55, the motor not being shown. Reel 55 is substantially one foot in diameter.

It is apparent from the description of FIG. 1 that the wire will be plated by the plating current read by ammeter 46, during its passage through the space between tubes 25 and 26. The plating current and the magnetizing current read by ammeter 44 will both produce a magnetizing field circular around the portion of wire 27 being plated. The current in solenoid 21 will produce a field along the axis of the wire 27 in the region where plating occurs. By well-known principles of magnetism, the resultant magnetizing field around the portion of wire passing through the plating region will be helical.

For use in data stores employing so-called destructive readout, in which the reading out of stored data destroys the storage of that data (as is described in the copending application of Blades previously referenced) I have found the following preferred set of conditions.

The wire 27 is tungsten 2 mils (thousandths of an inch) in diameter. The electrolyte is a water solution of iron sulfamate and nickel sulfamate containing 15 grams per liter of iron as ferrous ion and 77 grams per liter of nickel as nickelous ion. The pH of the solution is adjusted by addition of sulfamic acid as required to a value of 1.5. The solution temperature is maintained at 150 degrees Fahrenheit. The plating current (read by ammeter 46) is 200 milliamperes. The additional magnetizing current (read by ammeter 44) is also 200 milliamperes. The current through solenoid 21 is adjusted to produce a field component of 41 oersteds. The speed of rotation of spool 55 is adjusted to produce a wire speed of 20 inches per minute. The resultant plated nickel-iron alloy demonstrates a preferred axis helical about the central axis of the tungsten wire.

Tungsten is desirable as a base conductor material because of its stiffness and high tensile strength. Also, being ordinarily employed in applications where a high order of surface cleanliness is essential, it requires no preliminary treatment as ordinarily supplied. Copper or other conductive base materials may be used where their properties are satisfactory, but may require preliminary cleaning or other treatments according to well known techniques of the electroplating art. Also, since very thin electroplated coatings are known to follow the crystal structure of the base material, it may be necessary to employ a form of material having a very small crystalline structure (or an amorphous surface structure) if the natural crystal structure of the base material is unfavorable to the formation of the natural structure of the magnetic alloy. Thin magnetic alloy coatings are desirable for high-speed operation, but thicker ones may be desirable for relatively slow operation, in order that the induced voltages produced by the use of the plated conductor may be of satisfactory amplitude.

Figure 2:
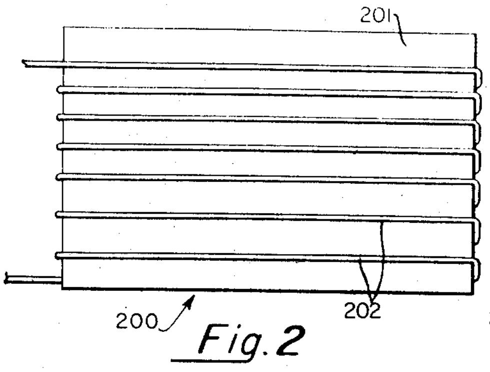
FIG. 2 represents a solenoid for producing a magnetizing field component for plating magnetic material having a preferred axis helical about a number of central conductors, which are represented in FIG. 3.
Figure 3:
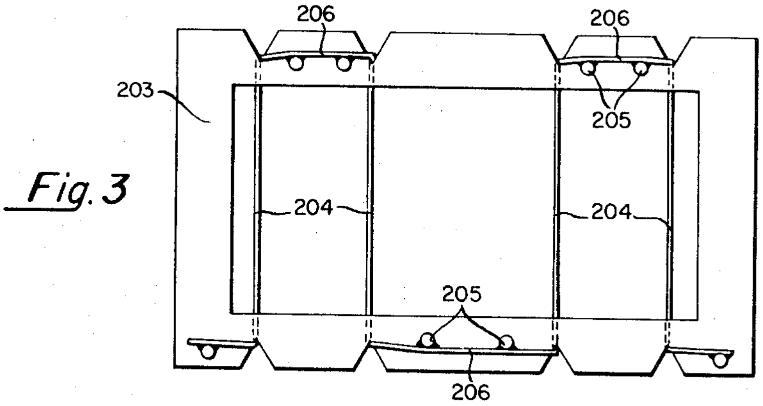
FIG. 3 represents a frame for holding a number of central conductors in position for plating.
Figure 4:
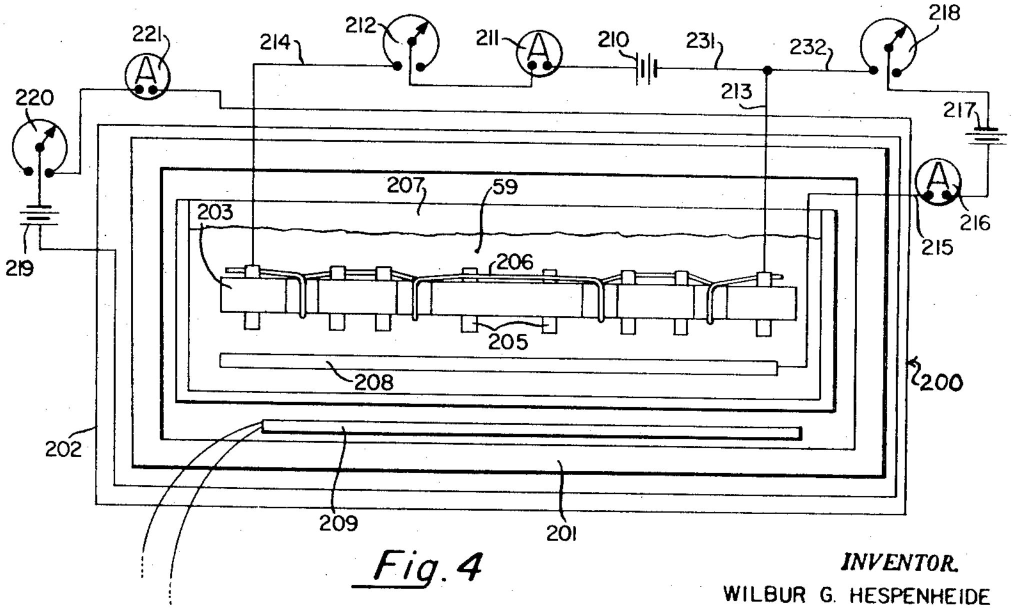
FIG. 4 represents the solenoid of FIG. 2, the frame and conductors of FIG. 3, and certain other apparatus for the process of plating the central conductors with magnetic material having a helical preferred axis.

It is not necessary to employ the continuous process of coating described in connection with FIG. 1, in order to practice my invention. FIGS. 2, 3, and 4 represent a useful way of practicing it with central conductors not in motion.

FIG. 2 represents a magnetizing solenoid 200 having a frame or support 201 and windings 202 of insulated wire.

FIG. 3 represents a frame 203 of suitable insulating material shaped to hold central conductors 204 spaced and parallel to each other. These central conductors are fastened to terminals 205; and the central conductors are connected in series with each other by continuations 206 which tie together the terminals 205 in pairs.

FIG. 4 represents the solenoid 200 situated around a container 207 (which may be a rectangular glass jar) in which there rests the frame 203 as represented in FIG. 3, and an anode 208 (which may conveniently be of nickel or nickel-iron alloy) to which there is connected conductor 205. The electrolyte 59 covers both anode 208 and the conductors 204. Heater 209 is provided to permit adjusting the bath temperature to a suitable value. Current from current source 219 (represented as a battery) passes through the winding 202 of solenoid 200, through ammeter 221, rheostat 220, and back to source 219. Suitable adjustment of rheostat 220 permits production of the desired magnetizing field component parallel to the axes of conductors 204 which, in this figure, are perpendicular to the plane of the figure. Magnetizing current from current source 210 (represented as a battery) flows through conductor 231, conductor 213, to the terminal 205 which is connected to one extreme of the series-connected conductors 204. The current then flows through the conductors 204 (via the continuations 206 between the pairs of terminals 205), out of the final terminal 205 into conductor 214, through rheostat 212 and ammeter 211 back to source 210. Plating current flows from source 217 (represented as a battery) through ammeter 216 and conductor 215 to anode 208, through the electrolyte 59 to conductors 204 (and casually also to terminals 205 and continuations 206, if they are not insulated) and thence through conductors 213 and 232 to rheostat 218 and thence back to source 217. Thus there are established the requisite flows of magnetizing and plating currents to cause the deposition upon conductors 204 in the open central portion of frame 203 of magnetic nickel-iron alloy having a helical preferred axis.

Figure 5:
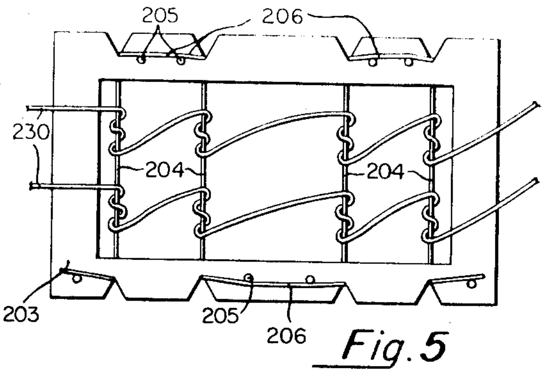
FIG. 5 represents the frame and conductors of FIG. 3 with additional windings to facilitate their use in a novel binary data store.

The preferred plating conditions for plating with the arrangement represented in FIG. 4 are the same as the preferred conditions for use with the arrangement represented in FIG. 1. However, the procedure of stretching the conductors 204 on a rigid support such as frame 203 has the advantage that a relatively soft central conductor, or one of very low tensile strength, or other property normally somewhat objectionable may be employed. To this end it is particularly useful to retain the conductors 204 on the frame 203 after plating, and apply the additional conductors required by the intended use to the conductors 204 in situ. Alternatively, if suitable provision is made to insure adequate circulation of the electrolyte into contact with all parts of the central conductors 204, the additional conductors may be applied before the operation of plating conductors 204. FIG. 5 represents an assembly like that of FIG. 3, but with the addition of conductors 230 wound as a series of solenoids around plated conductors 204. This will be recognized as one conventional form of data storage device which can make excellent use of the helical characteristic of the preferred axis of the plated magnetic alloy. Conductors 230 will ordinarily be required to be insulated in order that they may not make electrical contact with plated conductors 204. Since conductors 230 are solenoids about conductors 204, they may be applied before the operation of plating conductors 204, and current through insulated conductors 230 will produce a magnetizing field component axial to conductors 204 within the solenoid, but, in general not axial at those parts of conductors 204 lying outside the solenoids. Since it is the magnetic coating within the solenoids which is chiefly effective in use as a storage device, it will suffice if the external solenoid 200 is omitted in the plating operation and its field component is replaced as required by the passage of current through conductors 230 of such amplitude as to produce an equivalent field component at the surface of conductors 204 within the solenoids.

This basic idea may be expanded to a more general form. Thus a cloth of wires having bare woof and insulated warp wires, or vice versa, may be employed as a store with the bare wire being utilized like the conductors 204, and the insulated wires being utilized both to produce a magnetizing field component for plating, and to produce magnetizing field components and/or suffer the induction of voltages for use as a storage device.

In the figures, the plated coating on the conductors has not been represented separately because it would have added a complication to the understanding of the figures without adding to the understanding of the invention. Also, certain figures such as FIG. 5 would have had to be duplicated with the single difference that the plated coating would be represented on one figure, but not on the other. Such prolixity of figures seems undesirable.

It should be clearly understood that my Pat. No. 3,047,475, mentioned above, describes many combinations of conditions for plating magnetic nickel-iron alloys which are applicable to the present invention. The prior art teaches the electrodeposition of non-metallic materials which are ferromagnetic, such as ferrite materials. Deposition of such in a magnetizing field will produce alignment of the individual preferred directions, giving a ferromagnetic coating having orientations as herein described. Such procedure is applicable to the production of data storage devices as variously described herein.

What is claimed is:

1. A process of forming a magnetic memory array comprising the steps of:
- extending a plurality of solid wire conductors over a rigid frame parallel to each other;
- placing said parallel conductors in a coating cell while they are extended over said frame, which cell includes ferromagnetic material; and
- coating magnetic material from said coating cell onto said solid wire conductors with a preferred direction of magnetization.

2. A process according to claim 1 in which the step of coating magnetic material includes the step of applying a circumferential magnetizing field to at least some of said solid wire conductors while coating them to obtain a preferred direction of magnetization in the coating of said conductors.

3. A process according to claim 2 in which the step of applying a circumferential magnetizing field includes the step of conducting a current through said solid wire conductors.

4. A process according to claim 3 further including the step of extending a plurality of other conductors across the frame in a direction transverse to said first-mentioned conductors to form a matrix prior to placing said frame in said coating cell for coating.

5. A process according to claim 3 in which the step of coating magnetic material includes the step of plating magnetic material from a plating bath onto said conductors.

6. A process according to claim 4 further including the step of applying a longitudinal magnetizing field to said first-mentioned conductors while coating them by energizing said plurality of other conductors to determine the angle of the preferred direction of magnetization.

7. A process according to claim 3 in which the step of extending a plurality of solid wire conductors over a rigid frame includes the step of extending a plurality of uninsulated wire conductors over the rigid frame, and further including the step of extending a plurality of insulated conductors across the frame in a direction transverse to said uninsulated conductors to form a memory matrix.

8. A process of forming a magnetic memory array comprising the steps of.

extending a first plurality of solid wire conductors parallel to each other in a first direction;

extending a second plurality of conductors parallel to each other and crossing said first plurality of conductors to form a matrix;

immersing said first and second plurality of conductors in a plating solution, which solution includes ferromagnetic material; and sending a plating current through at least a portion of the surface of at least some of said first plurality of conductors and said solution to form a ferromagnetic plating on the surfaces through which the current is sent.

9. A process according to claim 8 in which said step of sending plating current through at least a portion of the surface of at least some of said first plurality of conductors includes the step of sending sufficient current through said conductors to establish a preferred direction of magnetization in said plating.

10. A process according to claim 8 in which said step of extending a first plurality of solid wire conductors includes the step of extending a continuous conductor across a frame a plurality of times to form a plurality of said first parallel conductors.

11. A process according to claim 8 further including the step of sending a current through said second plurality of conductors to create a preferred direction of orientation in said ferromagnetic plating of said first plurality of conductors and in which the step of extending said second plurality of solid wire conductors includes the step of extending insulated conductors across said frame.

12. A process of forming a magnetic memory matrix for storing binary data comprising the steps of:

mounting a first plurality of elongated solid conductors substantially parallel to one another across a rigid support member, coating said conductors along substantially their entire lengths with a magnetic material having a preferred direction of magnetization by performing said coating in the presence of a magnetic field, mounting a second plurality of elongated conductors transverse to said first plurality, and insulated therefrom, to produce magnetizing fields in the coating on said first plurality of conductors in their use as memory elements.

13. A process according to claim 12 in which the step of coating includes plating said first plurality of conductors while applying a circumferential magnetizing field to obtain a preferred direction of magnetization in the plating on said conductors.

14. A process according to claim 13 in which the step of plating said first plurality of conductors includes passing a plating current through said conductors and through a plating bath, and the step of applying a circumferential magnetizing field includes passing an additional current through said conductors while they are being plated.

15. A process of forming a magnetic memory matrix for storing binary data comprising the steps of:

plating a first plurality of elongated solid conductors along substantially their entire lengths with a magnetic material having a preferred direction of magnetization by performing said plating in the presence of a magnetic field, mounting said conductors on a frame of insulating material shaped to hold the conductors spaced from and substantially parallel to one another, mounting a second plurality of elongated conductors transverse to said first plurality, and insulated therefrom, to produce magnetizing fields in the plating on said first conductors in their use as memory elements.

16. A process according to claim 15 in which the step of plating includes passing a current through said conductors while they are being plated to obtain a circumferential magnetizing field and a preferred direction of magnetization in the plating on said conductors.

17. A process according to claim 16 including the further step of connecting said plated conductors to terminals along the opposite edges of said frame.

References Cited

UNITED STATES PATENTS

| | | | |
|---|---|---|---|
| 1,731,269 | 10/1929 | Rich | 204—206X |
| 2,882,214 | 4/1959 | Summers et al. | 204—279 |
| 2,656,283 | 10/1953 | Link et al. | 117—93.2X |
| 2,846,672 | 5/1957 | Hennessey | 340—174 |
| 2,877,138 | 3/1959 | Vodonik | 117—93.2X |
| 3,047,475 | 7/1962 | Hespenheide | 204—43 |

F. C. EDMUNDSON, Primary Examiner

U.S. Cl. X.R.

117—93.2; 204—27

Disclaimer 3,592,745.—*Wilbur G. Hespenheide*, Westlake Village, Calif. PROCESS FOR MANUFACTURING A MAGNETIC MEMORY. Patent dated July 13, 1971. Disclaimer filed Aug. 9, 1971, by the assignee, *Burroughs Corporation.*

Hereby disclaims all that portion of the term of said patent which extends beyond July 6, 1982.

[*Official Gazette November 2, 1971.*]